(12) United States Patent  (10) Patent No.: US 8,834,762 B2
Jung et al.  (45) Date of Patent: Sep. 16, 2014

(54) PLEATABLE NONWOVEN MATERIAL AND METHOD AND APPARATUS FOR PRODUCTION THEREOF

(75) Inventors: Anke Jung, Bayreuth (DE); Andreas Seeberger, Bayreuth (DE)

(73) Assignee: Irema-Filter GmbH (DE)

( * ) Notice: Subject to any disclaimer, the term of this patent is extended or adjusted under 35 U.S.C. 154(b) by 47 days.

(21) Appl. No.: 13/438,286

(22) Filed: Apr. 3, 2012

(65) Prior Publication Data

US 2012/0187593 A1  Jul. 26, 2012

(30) Foreign Application Priority Data

Mar. 28, 2006 (DE) .......................... 10 2006 014 236

(51) Int. Cl.
 *B29C 33/38* (2006.01)

(52) U.S. Cl.
 USPC ..................................... 264/172.18; 264/103

(58) Field of Classification Search
 USPC ............................................ 264/103, 172.18
 See application file for complete search history.

(56) References Cited

U.S. PATENT DOCUMENTS

| | | | |
|---|---|---|---|
| 5,672,399 A | 9/1997 | Kahlbaugh et al. | |
| 5,877,098 A * | 3/1999 | Tanaka et al. | 442/341 |
| 6,114,017 A * | 9/2000 | Fabbricante et al. | 428/198 |
| 6,319,865 B1 | 11/2001 | Mikami | |
| 2005/0129897 A1* | 6/2005 | Zhou et al. | 428/43 |
| 2006/0014460 A1 | 1/2006 | Alexander et al. | |

FOREIGN PATENT DOCUMENTS

| | | |
|---|---|---|
| DE | 41 23 122 A1 | 1/1993 |
| DE | 693 22 572 T2 | 12/1998 |
| DE | 29907699 | 8/1999 |
| DE | 10310435 | 6/2004 |
| DE | 10 2004 036 440 A | 2/2005 |
| DE | 102006013170 | 9/2007 |
| EP | 0590307 | 4/1994 |
| EP | 0 674 035 A2 | 9/1995 |
| GB | 2404347 | 2/2005 |
| JP | 02 264 057 A | 10/1990 |
| JP | 5 321 115 A | 12/1993 |
| JP | 6 346 310 | 12/1994 |
| RU | 2 188 693 C2 | 11/2000 |
| RU | 2 198 718 C1 | 10/2001 |
| WO | 03013732 | 2/2003 |
| WO | WO 2006/049664 A1 | 5/2006 |

OTHER PUBLICATIONS

International Search Report for corresponding application PCT/EP2007/002650 dated Jan. 16, 2008.

* cited by examiner

*Primary Examiner* — Christina Johnson
*Assistant Examiner* — Xue Liu
(74) *Attorney, Agent, or Firm* — Niels Haun; Ann Dorfman Herrell & Skillman, PC

(57) ABSTRACT

A pleatable nonwoven material is provided, including thicker form-giving fibers and thinner fibers determining the filter effect, wherein the thinner fibers are incorporated largely homogeneously in the thicker fibers running in the direction along the surface of the nonwoven material and a distribution density gradient of the thinner fibers is established perpendicular to the surface of the nonwoven material such that the highest concentration of thinner fibers is in the region of the center or on one of the two outsides, wherein the thicker and thinner fibers are bonded together by solidification from the melted condition and are made from the same material.

6 Claims, 5 Drawing Sheets

Illustration 1:

Illustration 2:

Illustration 3:

Illustration 4:

Illustration 5:

Illustration 6:

Illustration 7:

Illustration 8:

PLEATABLE NONWOVEN MATERIAL AND METHOD AND APPARATUS FOR PRODUCTION THEREOF

This application is a divisional under 35 U.S.C. §121 of application Ser. No. 12/295,263, filed Sep. 29, 2008, which is the National Stage of International Application No. PCT/EP2007/002650, filed Mar. 26, 2007, which claims the benefit of priority of German Application No. 10 2006 014 236.5, filed Mar. 28, 2006. The entire contents of all recited Patents and Patent Applications are herein incorporated by reference.

The invention relates to a pleatable nonwoven material comprising supporting, form-giving, thicker fibers and thinner fibers determining the filter effect as well as a method and an apparatus for production thereof A nonwoven material of this type is disclosed in DE 103 10 435 B3. In this prior-art filter element is provided an air-permeable support material which is coated on both sides with a fiber coating consisting of nanofibers or microfibers, wherein the coating thickness increases from the inflow side to the outflow side such as to form a progressive filter element. With respect to former prior art filter materials, this embodiment already resulted in a considerable improvement of the filter performance.

In such filter materials, which are conventionally pleated and are as such used as air filters in vehicles, a lowest possible pressure decrease is crucial when the air passes through since a low pressure decrease is synonymous with a small-size blower motor, and therefore with a correspondingly low energy consumption and a low noise development.

This demand for filter systems having a low pressure difference is in contrast with the necessary separation performance and the required service life.

These two demands can principally be fulfilled by fibers of different thicknesses, with usually approximately 20 µm on the one hand and approximately 4 µm on the other.

The progressive design of the fiber density is achieved in that the side of the nonwoven material on which the nonwoven material is laid down during the production is used as outflow side when it is inserted in the filter.

For further improvement of the filter properties, the industry focuses on the development of smaller and smaller fiber diameters for use in the filter production.

The so-called melt blowing process is currently the most common technique of producing fine fibers. Due to the constructional design, this process has so far been limited to fiber sizes of more than 2 µm. In this process, a low-viscosity medium is used which is torn apart at the attempt to achieve lower fiber thicknesses.

In order to increase the separation performance of the filter while minimizing the resulting increase in pressure loss, very fine fibers are important, however, because they lead to an increase of the inner surface area, thus enabling finer and finer particles to be separated while simultaneously increasing the service life.

A fiber size smaller than approximately 500 nm causes a so-called slip-flow effect to occur due to which, other than in the case of thicker fibers, the flow speed is not reduced to zero at the surface of the very thin fibers (nanofibers), thus enabling fine particles contained in the air stream to diffuse more easily while being intercepted and collected to a greater degree.

According to prior art, nanofibers of this type are produced from solution by means of a so-called electrospinning process as for example described in DE 103 10 435 B3. In this process, a polymer is dissolved by means of a solvent in order to produce fibers with a minimum diameter of up to 50 nm by applying a high voltage.

A considerable drawback of this electrospinning process is the use of large amounts of solvents. Due to the vapors developing in this process and the high voltage which is applied at the same time, there is a significant risk of explosion. Another critical aspect is that the vapors are harmful to the environment and therefore pose health risks to the operating staff. Another drawback is that the coating of the filter material is performed in a separate step, with the result that the nanofibers are located virtually exclusively on the surface of the coating. This multitude of layers makes a pleating of the nonwoven material extremely difficult. According thereto, a foldability of the material is conventionally only achievable by means of spot bonding.

Likewise, fiberglass media are known as well which have fiber thicknesses of below 1 µm. Since this material is so brittle that it will break when subject to a mechanical load which then causes particles to be released, the material must be classified as carcinogenic. Also, fiberglass media show very high pressure differences in relation to the separation performance.

DE 10 2004 036 440 A1 discloses a filter material in which nanofibers are distributed across a support frame. Electrospinning is mentioned to be a possible method of production. A similar filter material is also described in WO 2006/049664 A1.

JP 02-264057 A discloses a nonwoven material which is produced in the melt blowing process, wherein different materials are extruded from different spinnerets. The diameter of the first group of spinnerets amounts to approximately 8 µm while that of the second group of spinnerets amounts to ≤8 µm.

DE 693 22 572 T2 describes an embodiment in which spinnerets are arranged at an angle to each other.

EP 0 674 035 A2 discloses a spinning beam in which air is supplied from the side.

On this basis, it is the object of the invention to produce a pleatable non-woven material which on the one hand distinguishes itself by exceptional filter properties, in particular a low pressure difference and at the same time a high separation performance, while on the other hand being fabricable in an environmentally friendly and cost-effective way such as to achieve a high throughput performance.

Figure 1:
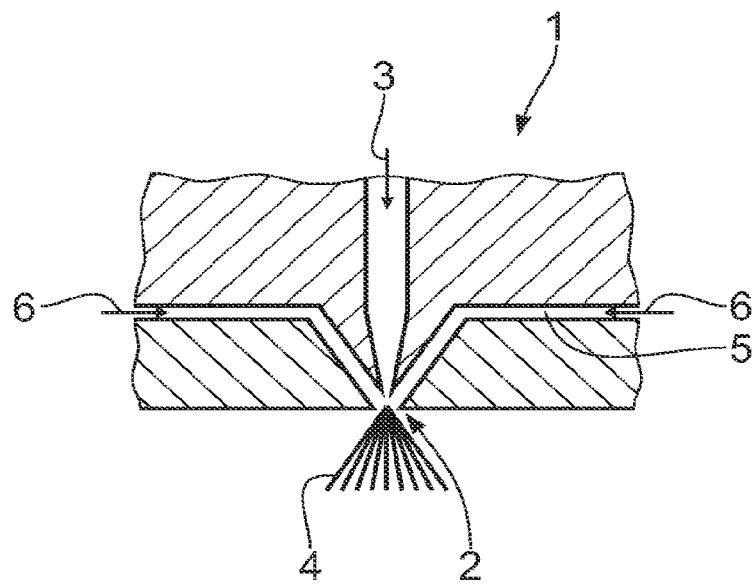
FIG. 1 shows a schematic sectional view of a spinning beam which comprises a plurality of spinnerets arranged next to each other through which a cone of compressed liquid polymer is discharged under pressure.

According to the invention, this object is achieved in that the thinner fibers are incorporated largely homogeneously in the thicker fibers in the direction along the surface of the nonwoven material, and in that a distribution-density gradient of the thinner fibers in the direction perpendicular to the surface of the nonwoven material is such that the highest concentration of thinner fibers is in the region of the center or at one of the two outsides, wherein the thicker and the thinner fibers are bonded together by solidification from the melted condition and are made from the same material.

It is advantageously provided that the thicker fibers have a diameter >2 μm and the thinner fibers have a diameter <1000 nm. In particular, the thicker fibers should have a diameter of between 2 and 200 μm while the thinner fibers should have a diameter of between 50 nm and 1000 nm. Such extremely thin nanofibers enable a particularly good filter effect to be achieved.

The fibers may advantageously consist of polyamide, polypropylene, polyester or a mixture thereof.

The invention also relates to a method of producing a pleatable nonwoven fabric, wherein a polymer is melted and pressed through the spinnerets of a spinning beam, and wherein the polymer threads thus produced are laid down on a conveyor belt so as to form a nonwoven layer, wherein it is provided according to the invention that spinnerets of various diameters are used for producing and laying down higher- and lower-thickness polymer threads in a single process step, wherein spinnerets of various diameters are used while simultaneously producing and laying down higher- and lower-thickness polymer threads in a single process step, wherein the diameter of the spinnerets <0.2 mm, preferably 0.15 mm, and for the fibers of higher thickness >0.2 mm, preferably 0.3-0.4 mm, and high-viscosity polymer melts are used whose melt flow index "mfi" is well below 500.

By means of this method, the desired homogeneous distribution of the thinner fibers in the support frame formed by the thicker fibers is achieved.

Favorably, at least two spinning beams are provided which are arranged at an angle to each other, wherein the polymer threads leaving the spinnerets of each spinning beam tangle and intertwine with each other before contact with the base or at the latest at the moment of contact therewith.

In particular, two spinning beams can be used, wherein a first spinning beam comprises larger-diameter spinnerets and a second spinning beam comprises smaller-diameter spinnerets.

In order to achieve long fibers with a very small diameter, it is crucial to use a high-viscosity polymer melt whose melt flow index "mfi" is well below 500.

Another important aspect is that the air supplied to the spinning beam has a relatively slight overpressure in the order of magnitude of 500 mbar.

The invention further relates to an apparatus for implementation of the above described method, the apparatus comprising spinning beams including a plurality of spinnerets arranged next to one another, and a conveyor belt for laying down the polymer threads leaving the spinnerets, the apparatus distinguishing itself by the fact that at least two spinning beams are provided which are arranged relative to each other such that when leaving the spinnerets, the polymer threads tangle before contact with the conveyor belt or at the latest at the moment of contact therewith, wherein a first spinning beam comprises larger-diameter spinnerets and a second spinning beam comprises smaller-diameter spinnerets, and wherein the diameter of the smaller-diameter spinnerets is <0.2 mm, preferably approximately 0.15 mm, and the diameter of the larger-diameter spinnerets is >0.2 mm, preferably 0.3-0.4 mm.

It is in particular provided that the spinning beams are arranged at an angle to each other, causing the thinner and thicker fibers to tangle and intertwine with each other upon discharge.

In particular, a first spinning beam may comprise larger-diameter spinnerets and a second spinning beam may comprise smaller-diameter spinnerets.

Finally, fans can be provided in the outlet region of the spinnerets for generation of an air stream in the order of magnitude of 500 mbar.

The spinnerets are particularly advantageously produced by lasering and have a diameter of <0.20 mm. This enables a high density of small-diameter spinnerets to be produced in an economical manner The invention will hereinafter be described in more detail by means of photographs taken with a scanning electron microscope and the drawing.

Figure 3A:
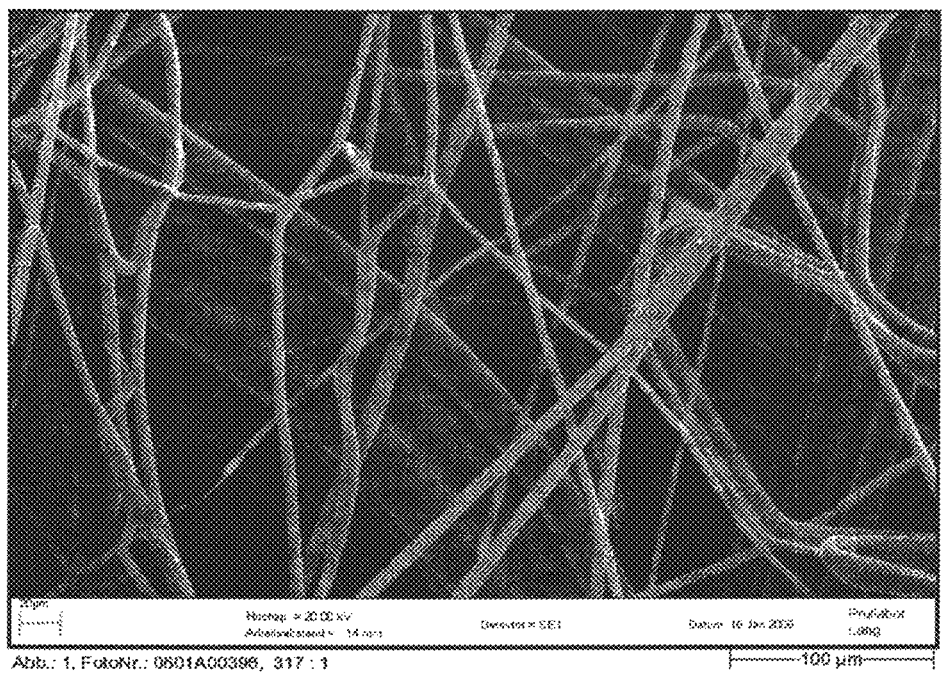
FIGS. 3A-3H illustrate photographs taken with a scanning electron microscope of material of the present invention.
Figure 3B:
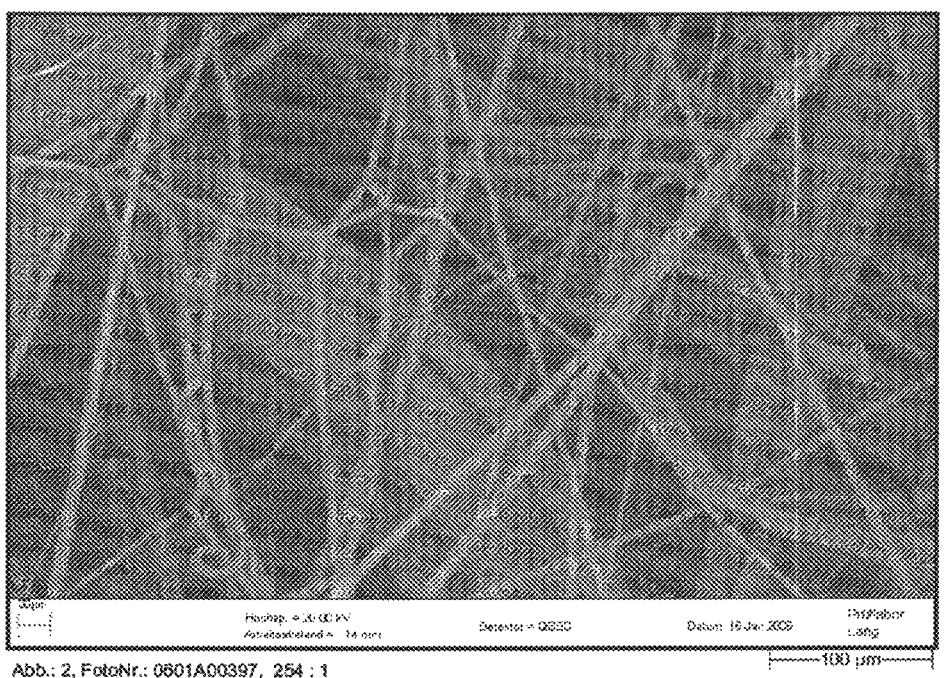

The following illustrations 1 and 2 show the distribution of the various fiber sizes. (See illustrations 1 and 2, FIGS. 3A, 3B).

Coarse fibers (diameter of approximately 15 μm) are mostly present in the form of multiple fibers. The coarse single fibers are joined together to form multiple fibers, wherein the fiber composites (up to 200 μm) are not only in loose contact with each other but the surfaces thereof are melted together for the most part.

Medium fiber diameters (approximately 1-2 μm) are mostly present in the form of single fibers, rarely in the form of fiber composites comprising a maximum of 3 fibers.

Figure 3C:
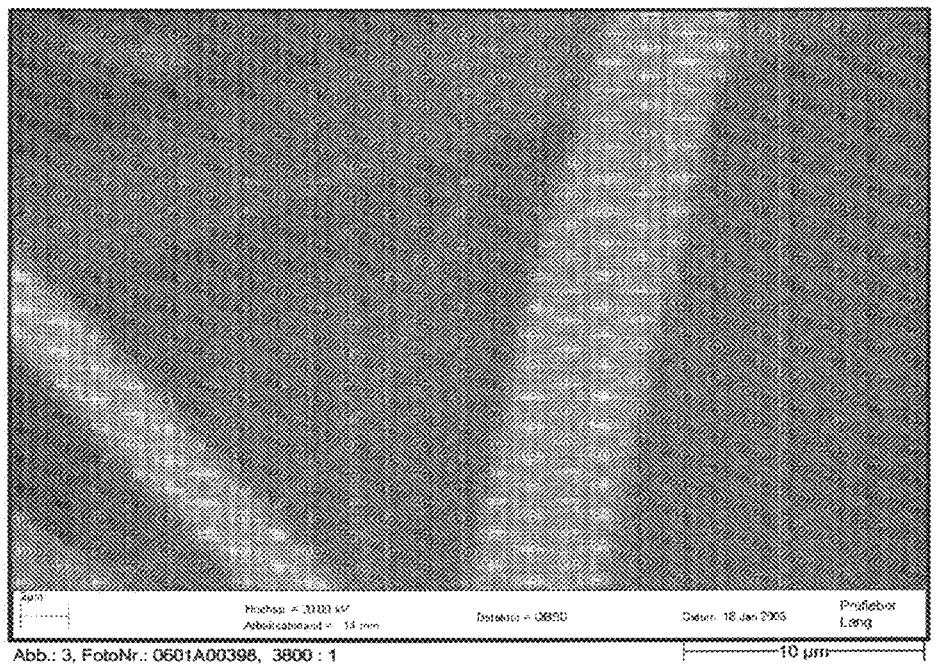

The overview photographs clearly show that a web of much thinner fibers (nanofibers <1 μm) passes through the fiber structure of the coarse and medium fiber diameters. The finest fibers are only present in the form of single fibers. (See illustration 3, FIG. 3C).

Figure 3D:
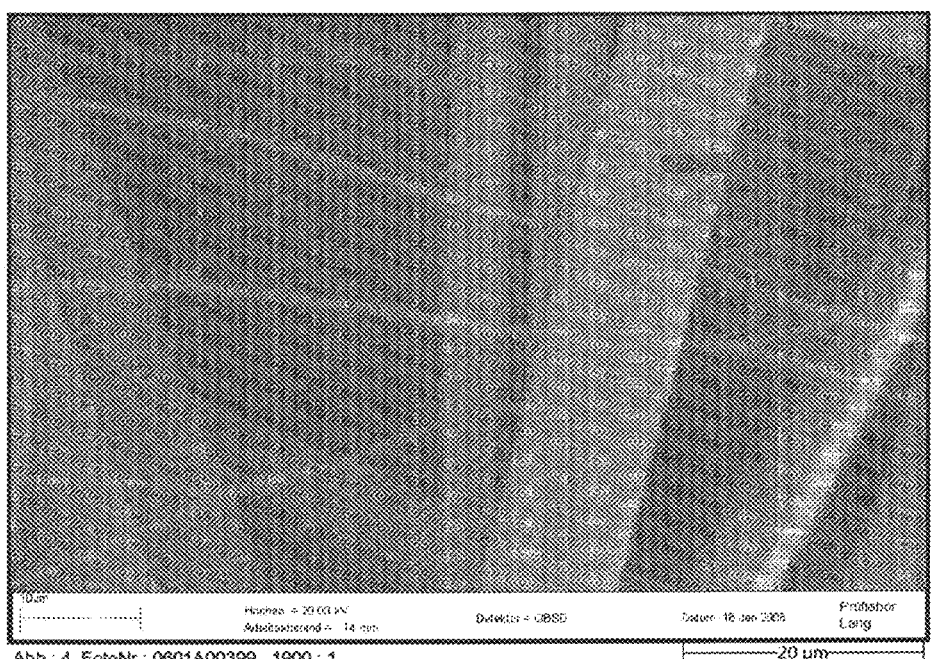

The diameters of the thin fibers amount to 733 nm or 857 nm, respectively. Fibers with diameters well below 1 μm are exclusively nanofibers. (See illustration 4, FIG. 3D).

Figure 3E:
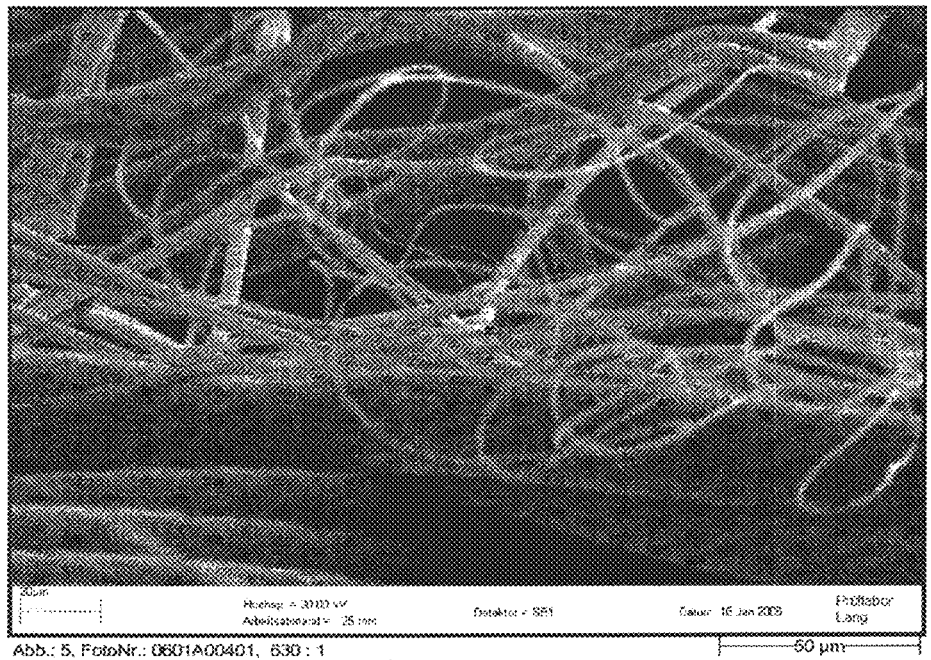

The high magnification shows the extreme difference between a "standard" fiber with a diameter of approximately 11 μm and the surrounding nanofibers of approximately 750 nm. (See illustration 5, FIG. 3E).

The photograph was taken at an angle of 70° to illustrate the fiber structures across the material cross-section.

Figure 3F:
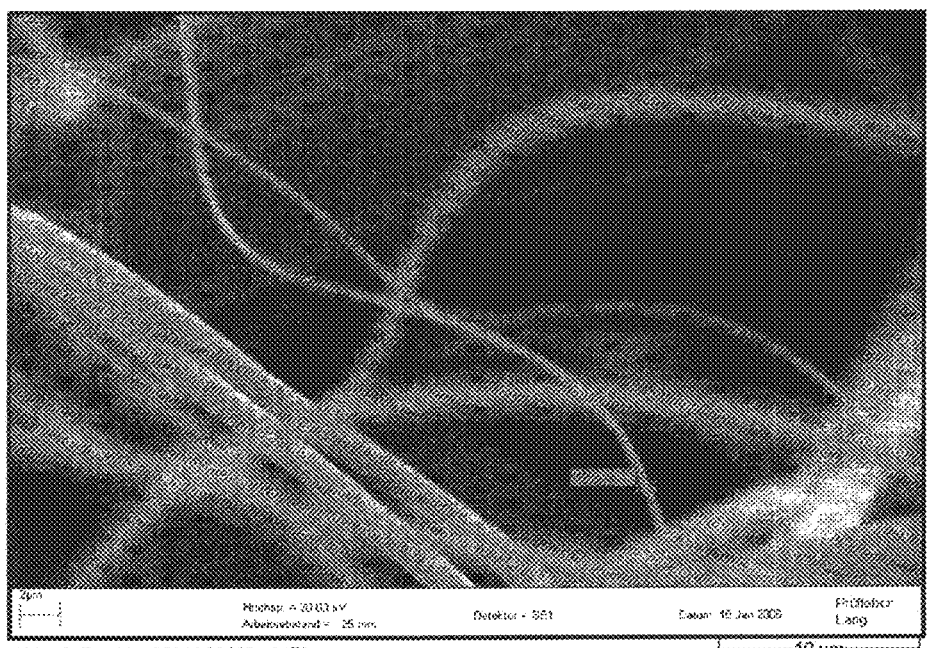

The lower part of the photograph shows the basic structure of thick, bonded fibers. The central part of the photograph shows a portion comprising fine fibers and nanofibers. The cover layer is formed by fibers with a medium diameter. (See illustration 6, FIG. 3F).

Figure 3G:
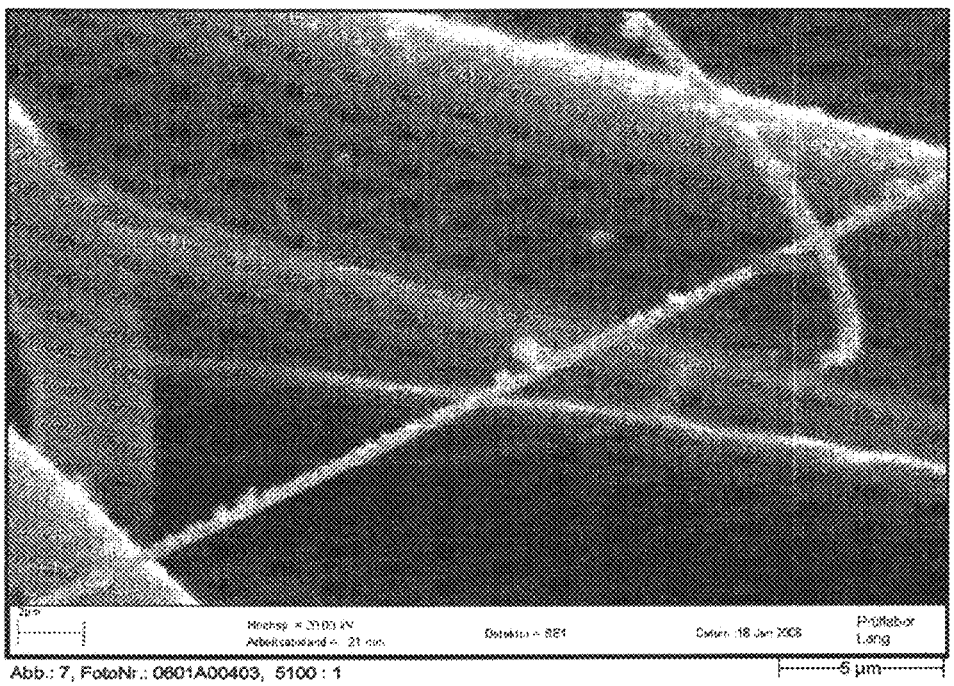

Nanofibers (measured value: 522 nm) next to fibers having a diameter of approximately 1-2 μm. (See illustration 7, FIG. 3G).

Upon exposure of the filter medium to NaCl particles (for approximately 15 minutes in the particle filter test bench):

There is a coarse fiber (diameter of approximately 10-15 μm) in the background. NaCl particles with a partially very small diameter (much smaller than 0.5 μm) have deposited on the surface of the fiber.

The number of particles deposited on the very thin nanofiber in the front (measured value: diameter of 426 nm) is similar to the number of particles on the thick fiber although the diameter of the finest fiber amounts to only approximately $\frac{1}{25}$ of that of the coarse fiber.

Figure 3H:
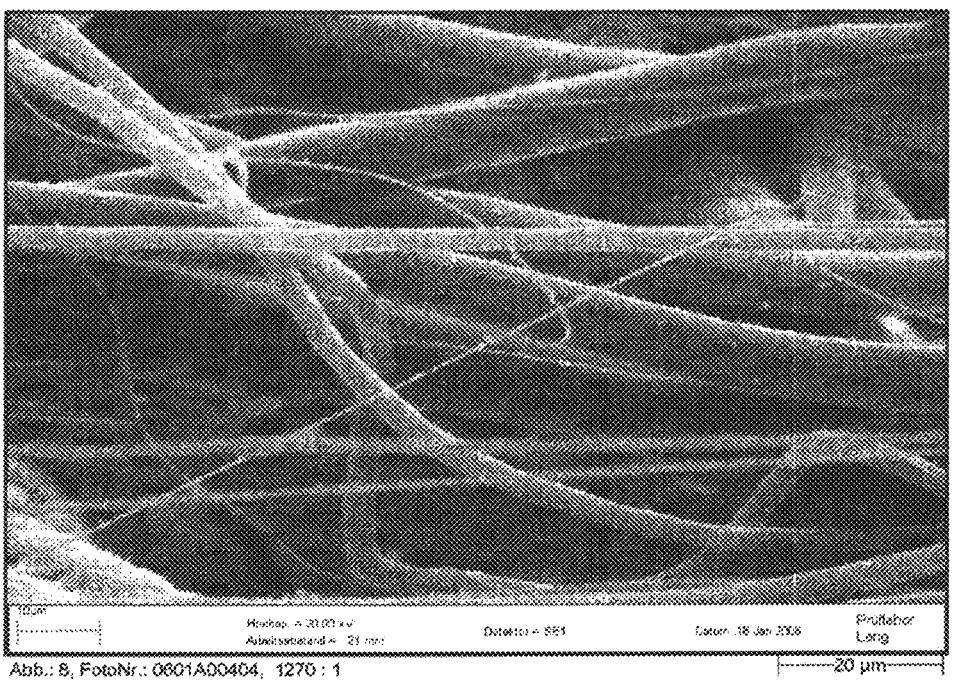

The illustration 8 shows an overview photograph of coarse, medium and nanofibers upon exposure to NaCl particles. (See illustration 8, FIG. 3H).

The inventive apparatus will hereinafter be described in relation to FIG. 1 and FIG. 2:

The hereinafter described FIG. 1 shows a schematic sectional view of a spinning beam 1 which comprises a plurality of spinnerets 2 arranged next to each other through which a cone 4 of compressed liquid polymer is discharged under pressure, as illustrated by the arrow 3. An air stream with a pressure of approximately 500 mbar generated by fans is supplied via air channels 5.

Figure 2:
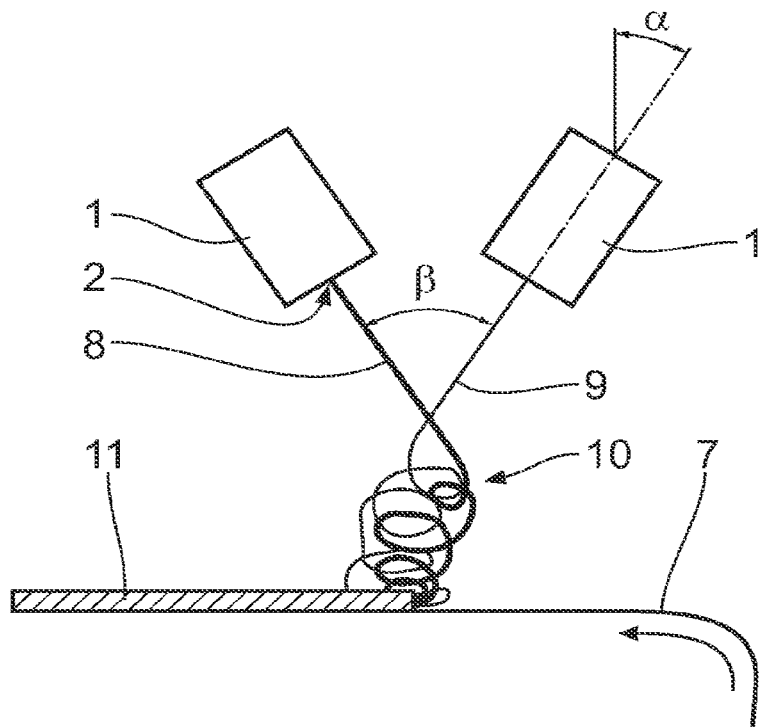
FIG. 2 shows a schematic view of two spinning beams which form an acute angle β with each other and are arranged at an angle α with respect to the vertical direction relative to a conveyor belt arranged underneath a spinning beam.

FIG. 2 shows a schematic view of two spinning beams 1 which from an acute angle β with each other and are arranged at an angle α with respect to the vertical direction relative to a conveyor belt 7 arranged underneath the spinning beam 1.

The spinning beam 1 on the left of FIG. 2 comprises larger-diameter spinnerets 2 while the spinning beam 1 on the right of FIG. 2 comprises smaller-diameter spinnerets so that larger-diameter polymer threads 8 tangle and intertwine with smaller-diameter polymer threads 9 in the region 10 before they are laid down on the conveyor belt 7 so as to form a nonwoven filter material 11. This process ensures that the thinner polymer threads 9 are distributed largely homogeneously among the thicker polymer threads 8.

The invention claimed is:

1. A method of producing a pleatable nonwoven fabric, comprising melting and pressing a polymer through a respective spinnerets of first and second spinning beams to produce polymer threads, and laying down the polymer threads thus produced on a conveyor belt to form a nonwoven layer, wherein spinnerets of different diameters are used and thicker and thinner polymer threads are simultaneously produced and are laid down in a single step, the diameter of the spinnerets for the thinner threads being <0.2 mm and >0.2 mm for the thicker threads, with high-viscosity polymer melts being used with a melt flow index "mfi" of below 500, wherein the first spinning beam comprises spinnerets of a first diameter and the second spinning beam comprises spinnerets of a second diameter smaller than the first diameter, and wherein the first and second spinning beams are disposed at an acute angle (β) with respect to each other.

2. A method according to claim 1, wherein the polymer threads leaving the spinnerets of each of the first and second spinning beams tangle and intertwine with each other before contact with the conveyor belt.

3. A method according to claim 1 wherein the temperature of the melted polymer, the pressure of air supplied to the first and second spinning beams, and the speed of the conveyor belt are adapted such that the surfaces for larger diameter threads are substantially melted together.

4. A method according to claim 1, wherein the temperature and the pressure of the melted polymer discharged by the spinnerets of the second spinning beam are adapted such that fibers emitted by each spinneret of the second spinning beam are nanofibers having a diameter less than about 1 μm.

5. A method according to claim 1, wherein the spinning beams are supplied with air having a pressure in the order of magnitude of 500 mbar.

6. A method of producing a pleatable nonwoven fabric according to claim 1, wherein the diameter of the spinnerets of the second spinning beam is 0.15 mm, and the diameter of the spinnerets of the first spinning beam is 0.3-0.4 mm.

* * * * *

UNITED STATES PATENT AND TRADEMARK OFFICE
CERTIFICATE OF CORRECTION

PATENT NO. : 8,834,762 B2
APPLICATION NO. : 13/438286
DATED : September 16, 2014
INVENTOR(S) : Anke Jung and Andreas Seeberger Page 1 of 1

It is certified that error appears in the above-identified patent and that said Letters Patent is hereby corrected as shown below:

On title page of the patent insert item --(62),
Related U.S. Application Data
Division of application No. 12/295,263, filed on Sep. 29, 2008, now abandoned, filed as application No. PCT/EP2007/002650 on Mar. 26, 2007.--.

On the title page of the patent, in item (74) "Ann" should read --Dann--.

Signed and Sealed this
Sixth Day of January, 2015

Michelle K. Lee
*Deputy Director of the United States Patent and Trademark Office*